US010129056B2

United States Patent
Thomas et al.

(10) Patent No.: US 10,129,056 B2
(45) Date of Patent: Nov. 13, 2018

(54) PHASE NOISE TRACKING AND REDUCTION

(71) Applicant: Nokia Solutions and Networks Oy, Espoo (FI)

(72) Inventors: Timothy Thomas, Palatine, IL (US); Mark Cudak, Rolling Meadows, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/283,654

(22) Filed: Oct. 3, 2016

(65) Prior Publication Data

US 2017/0026203 A1 Jan. 26, 2017

Related U.S. Application Data

(63) Continuation of application No. 14/259,862, filed on Apr. 23, 2014, now Pat. No. 9,491,010.

(51) Int. Cl.
*H04L 25/03* (2006.01)
*H04B 17/00* (2015.01)
(Continued)

(52) U.S. Cl.
CPC ... *H04L 25/03305* (2013.01); *H04B 17/0082* (2013.01); *H04B 17/345* (2015.01); *H04L 25/03006* (2013.01); *H04L 25/03178* (2013.01); *H04L 27/0014* (2013.01); *H04L 27/22* (2013.01); *H04L 2027/003* (2013.01);
(Continued)

(58) Field of Classification Search
CPC ......... H04L 25/03305; H04L 15/03006; H04L 25/03178; H04L 27/0014; H04L 27/22; H04B 17/345; H04B 17/0082
See application file for complete search history.

(56) References Cited

U.S. PATENT DOCUMENTS 5,471,508 A 11/1995 Koslov
5,832,040 A 11/1998 Yamanaka et al.
(Continued)

FOREIGN PATENT DOCUMENTS

WO 00/57609 A1 9/2000
WO 2007/137281 A2 11/2007

*Primary Examiner* — Kabir A Timory
(74) *Attorney, Agent, or Firm* — Harrington & Smith

(57) ABSTRACT

A group of data symbols for a current block of data symbols in multiple blocks received over a communication channel is equalized, based on a pilot block, to generate a group of equalized symbols. The group of equalized symbols is de-rotated as a function of a current phase estimate to determine initial de-rotated equalized symbols. The phase estimate is an estimate of phase caused by noise for blocks previous to the current block. Additionally, a phase metric is calculated from real and imaginary parts of the initial de-rotated equalized symbols, wherein the phase metric estimates phase caused by noise for the current block. The current phase estimate is updated with the phase metric. The initial de-rotated equalized symbols are de-rotated by the phase metric to determine final equalized and de-rotated symbol estimates. The final equalized and de-rotated symbol estimates are output. Apparatus, methods, and computer program products are disclosed.

15 Claims, 12 Drawing Sheets

(51) Int. Cl.
  *H04L 27/00*  (2006.01)
  *H04L 27/22*  (2006.01)
  *H04B 17/345* (2015.01)
  *H04W 84/04*  (2009.01)

(52) U.S. Cl.
  CPC .......... *H04L 2027/0016* (2013.01); *H04L 2027/0038* (2013.01); *H04L 2027/0046* (2013.01); *H04L 2027/0055* (2013.01); *H04L 2027/0067* (2013.01); *H04L 2027/0085* (2013.01); *H04W 84/042* (2013.01)

(56) References Cited

U.S. PATENT DOCUMENTS

| | | |
|---|---|---|
| 5,852,630 A | 12/1998 | Langberg et al. |
| 2002/0126748 A1* | 9/2002 | Rafie ............... H04L 27/0014 375/229 |
| 2007/0091996 A1 | 4/2007 | Yu et al. |
| 2007/0253497 A1 | 11/2007 | Chen |
| 2009/0073869 A1* | 3/2009 | Chadha ............... H04L 27/2662 370/208 |

* cited by examiner

PHASE NOISE TRACKING AND REDUCTION

CROSS REFERENCE TO RELATED APPLICATION

This application is a continuation of co-pending U.S. patent application Ser. No. 14/259,862, filed on Apr. 23, 2014.

TECHNICAL FIELD

This invention relates generally to wireless communications and, more specifically, to phase noise in wireless communications systems.

BACKGROUND

Because of the rapid increase in wireless data that is supposed to occur in the near future, research is being performed in certain areas such as millimeter wave (mmWave) in order to provide faster data rates, particularly for fifth-generation (5G) wireless services. A mmWave system may operate in the frequency range of 30 to 300 GHz and have corresponding wavelengths of 10 mm to 1 mm mmWave systems provide opportunity to increase data rates well beyond the current fourth-generation (4G) rates and into 5G rates.

However, a millimeter wave (mmWave) communication link has a number of problems that will have to be overcome. One such problem is phase tracking, which could be improved.

SUMMARY

This section contains examples of possible implementations and is not meant to be limiting.

An exemplifying method comprises: equalizing by an apparatus, based on a pilot block, a group of data symbols for a current block of data symbols in a plurality of blocks received over a communication channel to generate a group of equalized symbols; and de-rotating by the apparatus the group of equalized symbols as a function of a phase estimate to determine initial de-rotated equalized symbols, wherein the phase estimate is an estimate of phase caused by noise for blocks previous to the current block of data symbols. The method may additionally comprise: calculating by the apparatus a phase metric from real and imaginary parts of the initial de-rotated equalized symbols in the group, wherein the phase metric estimates phase caused by noise for the current block; updating by the apparatus the current phase estimate with the phase metric; de-rotating by the apparatus the initial de-rotated equalized symbols by the phase metric to determine final equalized and de-rotated symbol estimates; and outputting by the apparatus the final equalized and de-rotated symbol estimates.

In an additional exemplifying embodiment, an apparatus comprises: means for equalizing, based on a pilot block, a group of data symbols for a current block of data symbols in a plurality of blocks received over a communication channel to generate a group of equalized symbols; and means for de-rotating by the apparatus the group of equalized symbols as a function of a phase estimate to determine initial de-rotated equalized symbols, wherein the phase estimate is an estimate of phase caused by noise for blocks previous to the current block of data symbols. The apparatus may further comprise: means for calculating by the apparatus a phase metric from real and imaginary parts of the initial de-rotated equalized symbols in the group, wherein the phase metric estimates phase caused by noise for the current block; means for updating by the apparatus the current phase estimate with the phase metric; means for de-rotating by the apparatus the initial de-rotated equalized symbols by the phase metric to determine final equalized and de-rotated symbol estimates; and means for outputting by the apparatus the final equalized and de-rotated symbol estimates.

In a further example embodiment, an apparatus comprises: an equalizer configured to equalize, based on a pilot block, a group of data symbols for a current block of data symbols in a plurality of blocks received over a communication channel to generate a group of equalized symbols; and phase noise tracking and reduction circuitry configured to de-rotate the group of equalized symbols as a function of a phase estimate to determine initial de-rotated equalized symbols, wherein the phase estimate is an estimate of phase caused by noise for blocks previous to the current block of data symbols. The apparatus may further comprise phase noise tracking and reduction circuitry that is further configured to calculate a phase metric from real and imaginary parts of the initial de-rotated equalized symbols in the group, wherein the phase metric estimates phase caused by noise for the current block, the circuitry further configured to update the current phase estimate with the phase metric, to de-rotate the initial de-rotated equalized symbols by the phase metric to determine final equalized and de-rotated symbol estimates, and to output the final equalized and de-rotated symbol estimates.

An exemplifying apparatus comprises one or more processors and one or more memories including computer program code. The one or more memories and the computer program code are configured to, with the one or more processors, cause the apparatus to perform at least the following: equalizing, based on a pilot block, a group of data symbols for a current block of data symbols in a plurality of blocks received over a communication channel to generate a group of equalized symbols; and de-rotating the group of equalized symbols as a function of a phase estimate to determine initial de-rotated equalized symbols, wherein the phase estimate is an estimate of phase caused by noise for blocks previous to the current block of data symbols. The one or more memories and the computer program code may further be configured to, with the one or more processors, cause the apparatus to perform at least the following: calculating by the apparatus a phase metric from real and imaginary parts of the initial de-rotated equalized symbols in the group, wherein the phase metric estimates phase caused by noise for the current block; updating by the apparatus the current phase estimate with the phase metric; de-rotating by the apparatus the initial de-rotated equalized symbols by the phase metric to determine final equalized and de-rotated symbol estimates; and outputting by the apparatus the final equalized and de-rotated symbol estimates.

An exemplifying computer program product comprises a computer-readable storage medium bearing computer program code embodied therein for use with a computer. The computer program code comprises: code for equalizing by an apparatus, based on a pilot block, a group of data symbols for a current block of data symbols in a plurality of blocks received over a communication channel to generate a group of equalized symbols; and code for de-rotating by the apparatus the group of equalized symbols as a function of a phase estimate to determine initial de-rotated equalized symbols, wherein the phase estimate is an estimate of phase caused by noise for blocks previous to the current block of data symbols. The exemplifying computer program product may additionally include: code for calculating by the apparatus a phase metric from real and imaginary parts of the initial de-rotated equalized symbols in the group, wherein the phase metric estimates phase caused by noise for the current block; code for updating by the apparatus the current phase estimate with the phase metric; code for de-rotating by the apparatus the initial de-rotated equalized symbols by the phase metric to determine final equalized and de-rotated symbol estimates; and code for outputting by the apparatus the final equalized and de-rotated symbol estimates.

BRIEF DESCRIPTION OF THE DRAWINGS

In the attached Drawing Figures:

FIG. 12, including

DETAILED DESCRIPTION OF THE DRAWINGS

As described in more detail below, blind algorithms for carrier phase tracking can have reasonable performance for BPSK and QAM symbols. However, example embodiments herein improve on the performance at lower SNRs and higher SNRs without a significant increase in complexity over, e.g., a PLE algorithm (e.g., the power law estimator (PLE) of M. Moeneclaey and G. de Jonghe, "ML-Oriented NDA Carrier Synchronization for General Rotationally Symmetric Signal Constellations," IEEE Transactions on Communications, Vol. 42, No. 8, August 1994, and F. Rice, B. Cowley, B. Moran, and M. Rice, "Cramer-Rao Lower Bounds for QAM Phase and Frequency Estimation," IEEE Transactions on Communications, Vol. 49, No. 9, September 2001).

An example embodiment comprises a phase noise tracking algorithm for BPSK and QAM symbols when the phase noise changes from one NCP-SC block to the next. Example embodiments use an improved metric (see, e.g., Eq. 20 below) for improved low SNR performance relative to conventional systems. Another example embodiment also involves a method of using the BPSK metric with QAM symbols, which has lower complexity than the PLE estimator for QAM symbols. A further example embodiment also has a QAM-blind phase noise tracking method, which uses outer constellation points of received QAM constellations for phase noise tracking.

Another aspect besides the signal processing algorithms is a blind tracking of the gradual changes of the phase noise from one data block to the next while starting with a good phase estimate from an initial block of pilots. An observation that has been made is that the channel estimate found from the first block of pilots can adequately equalize all of the data blocks within a slot. However, the severe phase noise from practical mmWave local oscillators (LOs) causes a phase rotation on the equalized signal constellations on each of the data blocks. However, from one data block to the next, the difference in the phase noise is relatively small (e.g., no more than 10 degrees). What this small difference means is that the phase rotation of the equalized signal constellation can be tracked from block to block using a blind algorithm which only needs to estimate a small phase difference (and hence can use simplified formulas relative to conventional systems). It is believed that mmWave systems will need this sort of phase noise tracking unless additional overhead is added in the form of pilot symbols on each data block.

Figure 1:
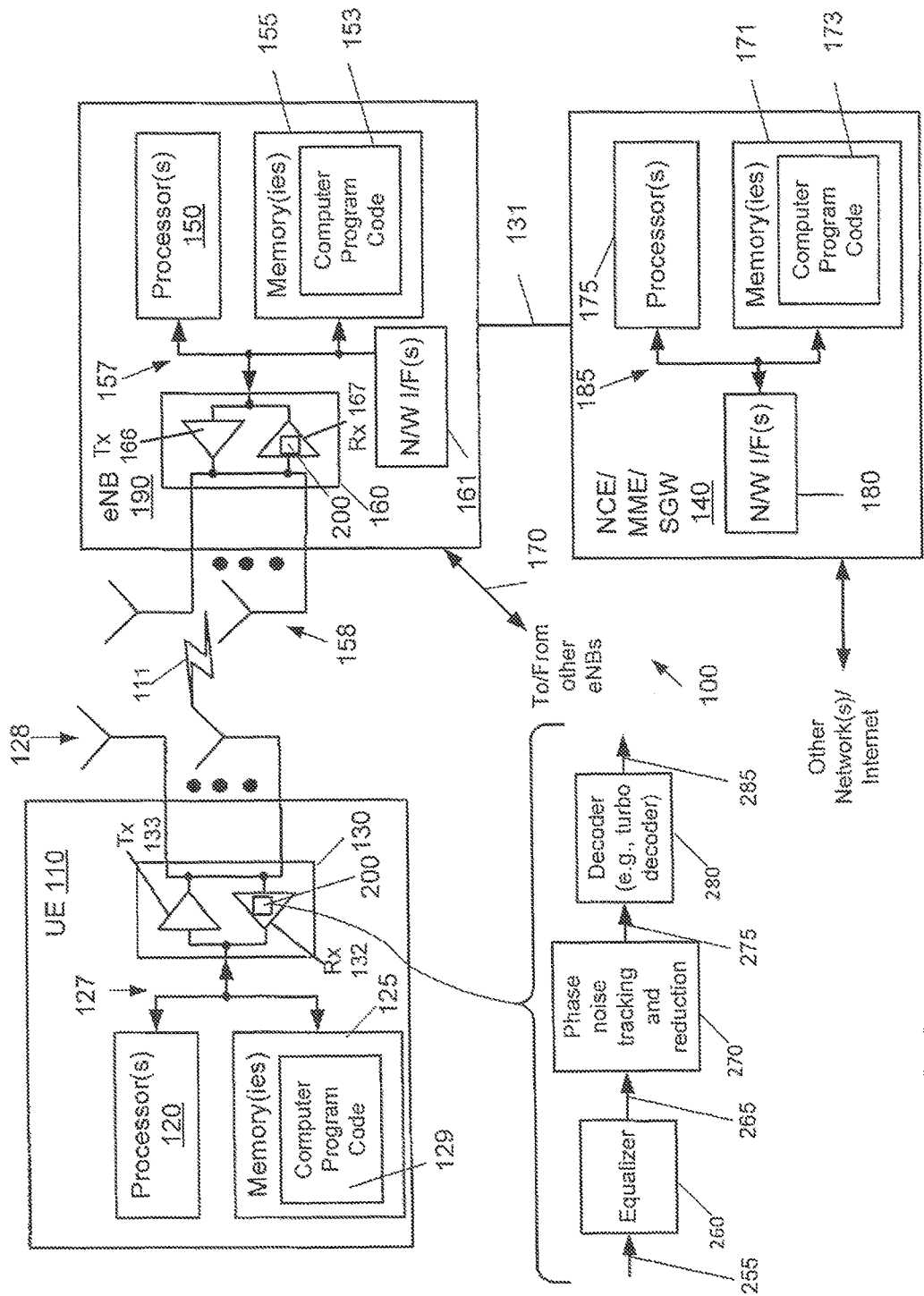
FIG. 1 illustrates an example system suitable for practicing example embodiments herein.

Before proceeding with additional description of possible problems with conventional techniques and further description of phase noise tracking, reference is made to FIG. 1, which shows a block diagram of an example system in which the example embodiments may be practiced. In FIG. 1, UE 110 is in wireless communication with a network 100. The user equipment 110 comprises one or more processors 120, one or more memories 125, and one or more transceivers 130 (each comprising a receiver, Rx, 132, and a transmitter, Tx, 133) interconnected through one or more buses 127. The one or more transceivers 130 are connected to one or more antennas 128. The one or more memories 125 comprise computer program code 129.

The receiver 132 comprises a receiver portion 200 that comprises an equalizer 260, phase noise tracking and reduction circuitry 270, and a decoder 280. The equalizer 260 operates on a received signal 255 to perform equalization (as is known conventionally) on the received signal 255 to create an equalized signal 265. An example of equalization that might be performed is illustrated in Martin V. Clark, "Adaptive Frequency-Domain Equalization and Diversity Combining for Broadband Wireless Communications", IEEE Journal on Selected Areas in Communications, Vol. 16, No. 8, 1385-1395 (1998). The phase noise tracking and reduction circuitry 270 performs phase noise tracking and reduction as described herein and outputs a signal 275 having reduced phase noise (relative to the phase noise in the equalized signal 265). A decoder 280, such as a turbo decoder, performs decoding as is conventionally known to produce output bits 285. For instance, the following reference has an example of turbo decoding: Claude Berrou, "Near Optimum Error Correcting Coding and Decoding:

Turbo-Codes", IEEE Transactions on Communications, Vol. 44, No. 10, 1261-1271 (1996).

Some or all of the phase noise tracking and reduction circuitry 270 may be implemented in hardware, such as via a programmable logic device like a field programmable gate array, an integrated circuit, and the like. Alternatively, the phase noise tracking and reduction circuitry 270 may be implemented in part or completely as a processor configured to execute software, such that the one or more memories 125 and the computer program code 129 are configured, with the one or more processors 120, to cause the user equipment 110 (or some other apparatus such as a modem, receiver chip, or the like) to perform one or more of the operations as described herein. For instance, a processor 120 may be implemented as a DSP that performs some or all of the functionality of the phase noise tracking and reduction circuitry 270. The DSP (as a processor 120) may be implemented "outside" the receiver 132, as shown in FIG. 1, or could be implemented as part of the receiver 132 or transceiver 130. Modern communications devices are complex structures and there may be multiple processors and hardware elements. Additionally, the line between what is circuitry and what is software has blurred. A field programmable gate array, for instance, is a hardware element that can be configured and potentially reconfigured using a memory (typically called "firmware"), commonly programmed via a hardware description language, to perform different logic functions. A hardware description language or HDL is a specialized computer language used to program the structure, design and operation of electronic circuits, and thus is potentially akin to "software". UE 110 communicates with eNB 190 via a wireless link 111.

The eNB 190 comprises one or more processors 150, one or more memories 155, one or more network interfaces (N/W I/F(s)) 161, and one or more transceivers 160 (each comprising a receiver, Rx, 167 and a transmitter, Tx, 166) interconnected through one or more buses 157. The one or more transceivers 160 are connected to one or more antennas 158. The one or more memories 155 comprise computer program code 153. Note that the receiver 167 may also comprise a version of the receiver portion 200, which could be implemented as circuitry or software. For instance, the phase noise tracking and reduction circuitry 270 (as an example of part of the receiver portion 200) may be implemented in part or completely as a processor configured to execute software, such that the one or more memories 155 and the computer program code 153 are configured, with the one or more processors 150, to cause the eNB 190 (or some other apparatus such as a modem, receiver chip, or the like) to perform one or more of the operations as described herein. It should be noted that although an eNB is described herein, other elements may be used (e.g., depending on the type of wireless network 100), such as an access point or other element that provides access to the wireless network.

The one or more network interfaces 161 communicate over one or more networks such as the networks 170 and 131. Two or more eNBs 190 communicate using, e.g., network 170. The network 170 may be wired or wireless or both and may implement, e.g., an X2 interface.

The wireless network 100 may comprise a network control element (NCE) 140 that may comprise MME/SGW functionality, and which provides connectivity with a further network, such as a telephone network and/or a data communications network (e.g., the Internet). The eNB 190 is coupled via a network 131 to the NCE 140. The network 131 may be implemented as, e.g., an S1 interface. The NCE 140 comprises one or more processors 175, one or more memories 171, and one or more network interfaces (N/W I/F(s)) 180, interconnected through one or more buses 185. The one or more memories 171 comprise computer program code 173.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may comprise one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, meter devices, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 4:
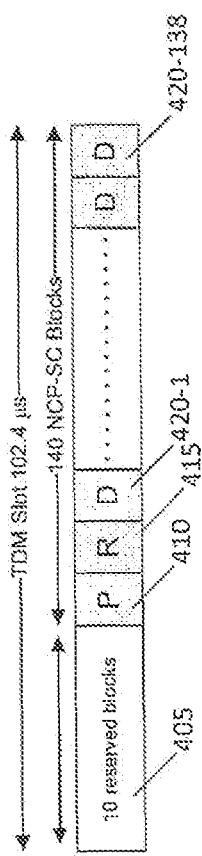
FIG. 4 illustrates a slot structure of an NCP-SC system.

Turning briefly to FIG. 4, this figure illustrates a slot structure of an NCP-SC system used below as an example. Reference 405 represents 10 blocks of reserved period that may be used for control signaling. Block P, 410, represents a pilot block, or reference block, that provides a known waveform used to estimate the channel. The pilot block may be comprised entirely of a known waveform or may be further multiplexed with data or control information. Block R, 415, represents reserved data for an associated control channel Blocks D, 420-1 through 420-138, represent bearer data containing, e.g., Internet Protocol or other data packets.

An introduction is now presented to provide some information on phase noise. Depending on its magnitude, phase noise can significantly impact the performance of mmWave systems. Phase noise is described in A. Demir, A. Mehrotra, J. Roychowdhury, "Phase Noise in Oscillators: A Unifying Theory and Numerical Methods for Characterization," IEEE Transactions on Circuits and Systems-I: Fundamental Theory and Applications, Vol. 47, No. 5, May 2000. Phase noise, θ(t), can be modeled as a random time-varying phase added to the carrier as:

$$y(t)=a(t)e^{j(2\pi f_o t+\theta(t))}, \quad (1)$$

where $f_o$ is the carrier frequency. At digital baseband the phase noise is modeled as $$y(n)=a(n)e^{j\theta(n)}, \quad (2)$$

where θ(n) is the phase noise at the sample time n and a(n) is the regular baseband signal.

The phase noise is a random process and typically becomes uncorrelated between two time values or sample times which are sufficiently far apart but are correlated at two time values or sample times which are relatively close to each other. How the time correlation behaves depends on the power spectral density (PSD) and some example PSDs are given in FIG. 2. Three measured PSDs from mmWave equipment are shown (a receiver local oscillator (LO) 210 which would be similar to transmitter LOs, a voltage controlled oscillator (VCO) which, for example, may be at the analog front end (AFE) at the transmitter 230, and a VCO at the AFE at the receiver 220) along with the PSD of the phase noise for 802.11ad 240 (see IEEE P802.11ad/D5, "IEEE Draft Standard for Local and Metropolitan Area Networks—Specific Requirements—Part 11: Wireless LAN Medium Access Control (MAC) and Physical Layer (PHY) Specifications—Amendment 3. Enhancements for Very High Throughput in the 60 GHz Band), whose PSD is given as (see C. Zhang, et. al., "Performance Analysis on the OFDM PHY of IEEE 802.11ad Standard," Proc. of ICCP2011 (International Conference on Computational Problem-Solving):

$$PSD(f) = PSD(0) \frac{1 + (f/f_z)^2}{1 + (f/f_p)^2}, \quad (3)$$

where $f_z$ is the zero frequency which is 100 MHz, $f_p$ is the pole frequency which is 1 MHz, and the PSD value at 0 Hz is PSD(0) which is −90 dBc/Hz (dBc is dB relative to the carrier). Note that the PSD of the receiver LO is shown with an additional 15.6 dB over the actual measured value because the true phase noise will be that much larger because a 6× (6 times) multiplier is used to get the 12.74 GHz LO up to the 76 GHz needed to modulate an intermediate signal which is at 4 GHz up to a desired 72 GHz carrier frequency.

Figure 3A:
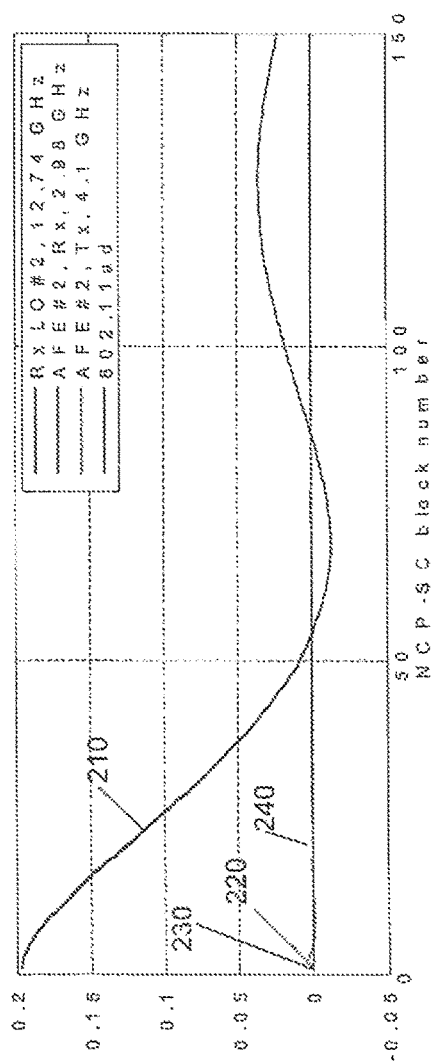
FIGS. 3A and 3B are graphs of example autocorrelation of the phase noise (FIG. 3A) and correlation of the phase noise (FIG. 3B) from the PSDs of FIG. 2, where a null cyclic prefix single carrier (NCP-SC) block is 683 nsec long.
Figure 3B:
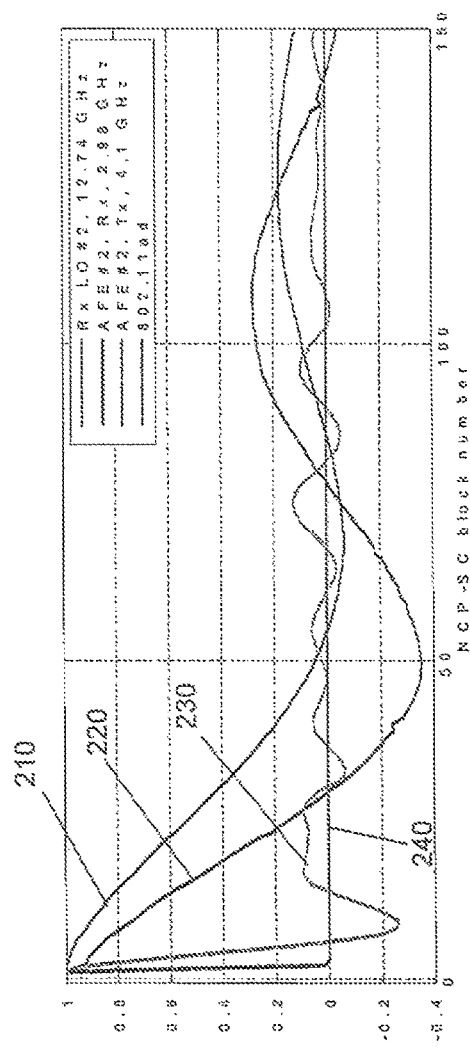

A PSD which is narrower in frequency will produce phase noise which is more correlated in time than a PSD which is wider in frequency. For example the curves of the PSD (the LO 210 and the VCO of the receiver 220) both have relatively similar plateaus in width (with different scaling factors) and hence have similar correlation as seen in the plot of FIG. 3B. The VCO of the transmitter 230 has a much wider plateau and hence its correlation in time is even less. Finally the 802.11ad 240 model of the PSD is so wide in frequency that the phase noise is uncorrelated from symbol block to symbol block (and even symbol to symbol within a symbol block). As described below, a symbol block is a group of data or pilot symbols which are processed jointly as a group at a receiver to produce, for example, equalized data symbols or pilot estimates. The processing is typically done in the frequency domain in mmWave systems because of the large bandwidths employed. The correlation is important because a fully correlated phase noise, regardless of how strong, will mean that the phase can be completely tracked from one symbol block to the next symbol block. Uncorrelated phase noise means that the phase is impossible to track from symbol block to symbol block (and likely will even change significantly within a symbol block) but if the phase noise has low magnitude the phase noise will not affect performance. The magnitude of the phase noise is given by the power in the autocorrelation which is shown in FIG. 3A. As can be seen, the LO is the dominating factor by far in terms of phase noise. Examples of phase noise and its effect on a signal constellation are shown below.

Figure 5:
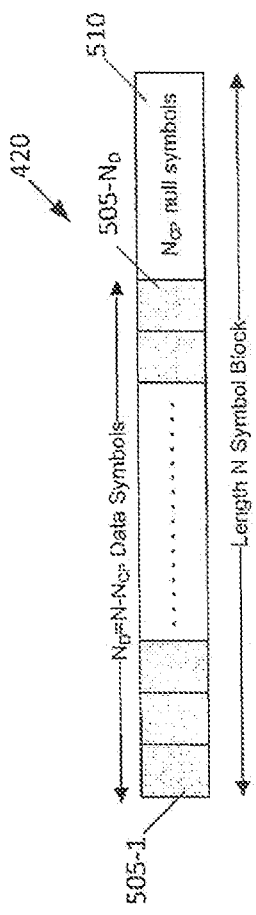
FIG. 5 illustrates a structure of an NCP-SC symbol block.

Multiple techniques are now described for estimating and correcting the phase noise. A null-cyclic prefix single carrier (NCP-SC) system will be used as an example system with the slot structure shown in FIG. 4. However the phase noise correction methods will also work with other modulation techniques, including, but not limited to orthogonal frequency division multiplexing (OFDM), spread OFDM, zero-tail spread OFDM, and cyclic prefix single carrier. A block of 10 NCP-SC blocks 405 is reserved for future use such as control, then a pilot (P) NCP-SC block 410 is sent which is followed by another reserved (R) NCP-SC block 415. Finally, 138 data (D) symbol blocks 420-1 through 420-138 are sent which contain the coded data (where a codeword spans 3 NCP-SC symbol blocks). A NCP-SC block 420 (data, pilots, or control) will have the structure shown in FIG. 5 where there are $N_D$ data, pilot, or control symbols 505-1 through 505-$N_D$ followed by a block of $N_{CP}$ null symbols 510. It is noted that the block of $N_{CP}$ null symbols 510 may be used for purposes such as changing RF beam forming weights from one UE to a second UE. In NCP-SC the $N_{CP}$ null symbols in one NCP-SC block act as the cyclic prefix for the next NCP-SC block. The use of cyclic prefixes turns the linear convolution of the time-domain transmitted signal to circular convolution over a NCP-SC block which then enables simple frequency-domain processing of the received NCP-SC block to, for example, equalize the received data symbols within a NCP-SC block.

Figure 2:
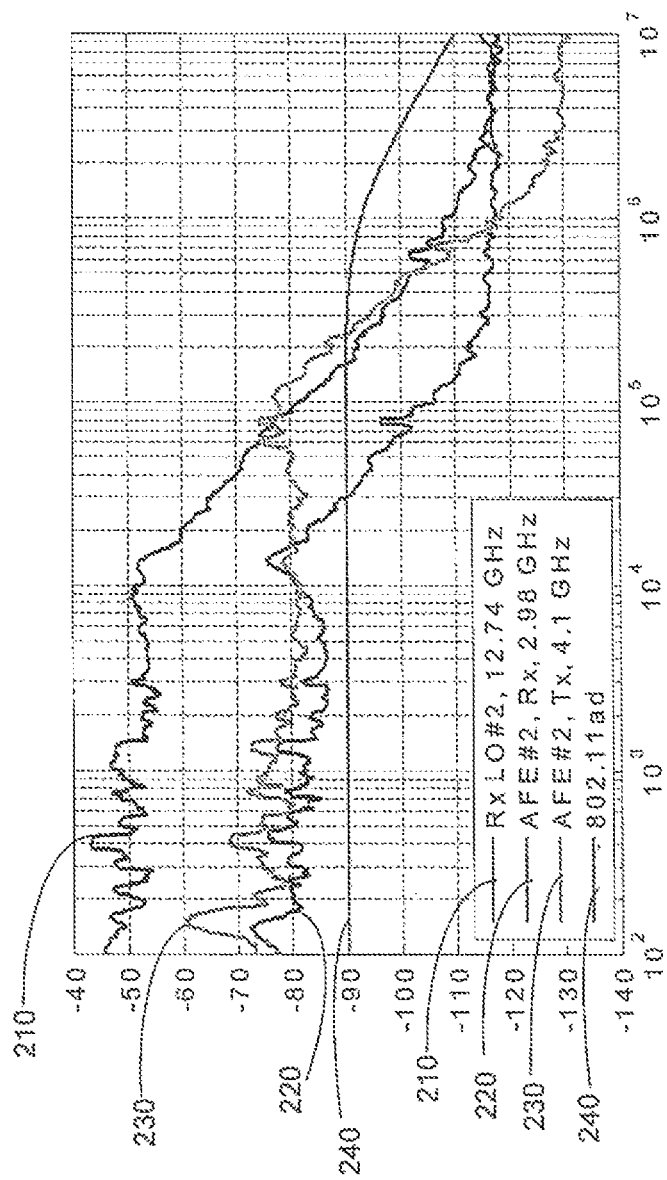
FIG. 2 is a graph of example PSDs of phase noise for three measured components from mmWave equipment and also the equation from IEEE 802.11ad.
Figure 6:
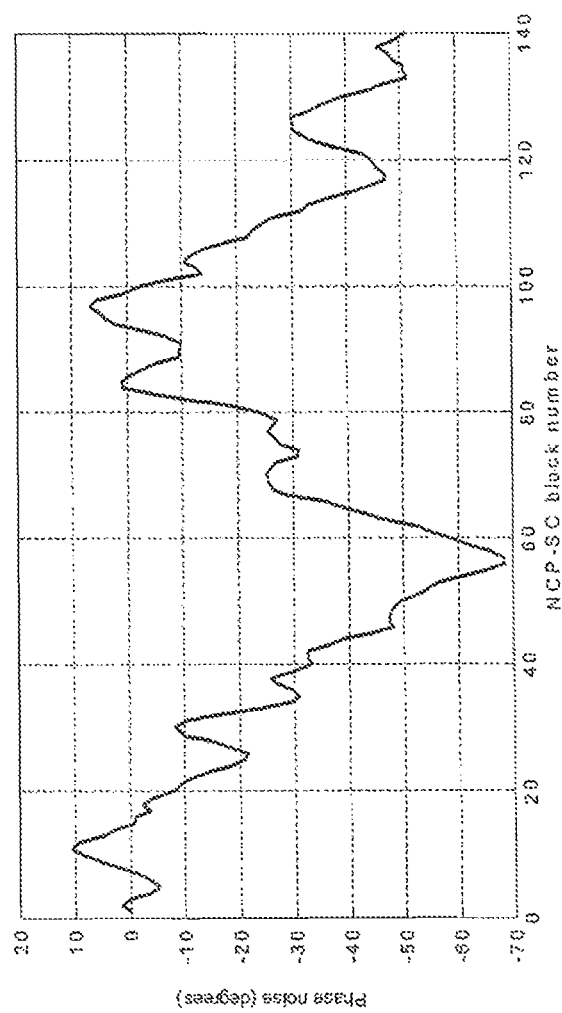
FIG. 6 is a graph of phase noise realization for the distorted QPSK constellation in FIG. 7.
Figure 7:
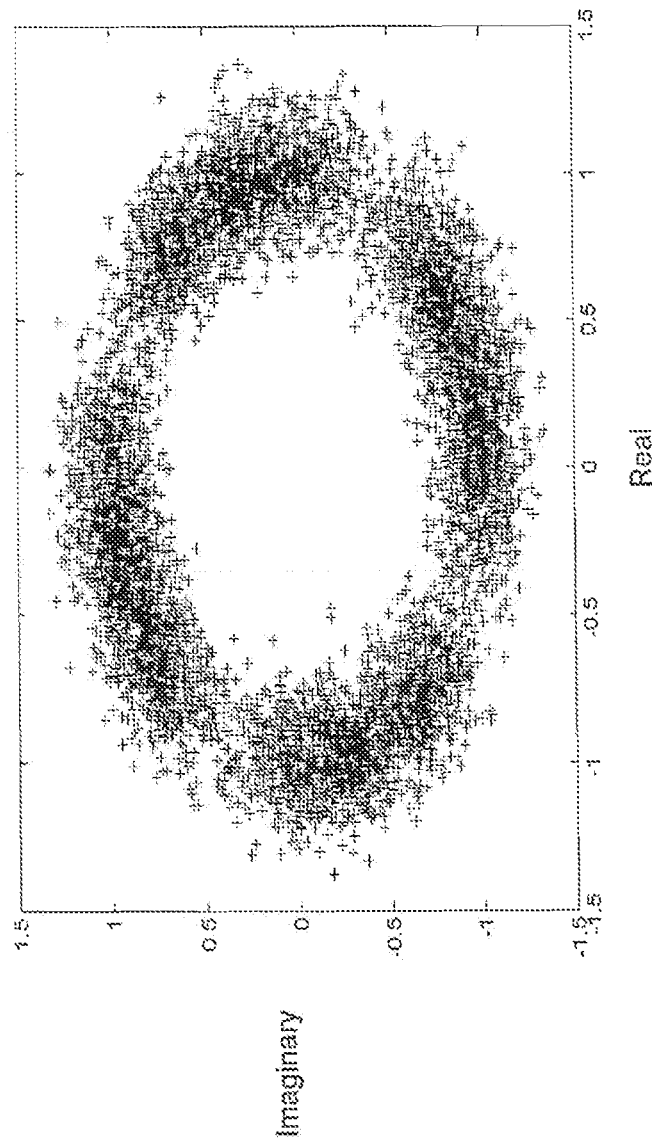
FIG. 7 is a graph of equalized QPSK constellation including the effect of phase noise for an SNR=15 dB.

The assumption is that the channel will not change significantly across the slot. However, with phase noise the equalized signal constellation will rotate by an unknown phase value from one NCP-SC block to the next. This effect occurs because, despite the channel not changing across the NCP-SC block, the effective channel at each NCP-SC block will be equal to the one measured on the pilot NCP-SC block multiplied by an unknown phase value, $\exp(jn_p(b))$ where $n_p(b)$ is the phase noise at NCP-SC block b. An example phase noise realization for the measured PSDs of FIG. 2 is given in FIG. 6 and the effect on the equalized QPSK constellation is shown in FIG. 7 for an SNR of 15 dB. As can be seen the phase noise will significantly degrade the system performance but the phase noise realization changes relatively slowly from one NCP-SC block to the next and hence it should be able to be tracked.

There are multiple existing algorithms which can be used to estimate the phase. Basically the problem of phase noise tracking for a NCP-SC system is the same as blind tracking of the carrier phase. See, e.g., F. Rice, B. Cowley, B. Moran, and M. Rice, "Cramer-Rao Lower Bounds for QAM Phase and Frequency Estimation," IEEE Transactions on Communications, Vol. 49, No. 9, September 2001; and M. Moeneclaey and G. de Jonghe, "ML-Oriented NDA Carrier Synchronization for General Rotationally Symmetric Signal Constellations," IEEE Transactions on Communications, Vol. 42, No. 8, August 1994. In fact M. Moeneclaey and G. de Jonghe has a relatively straight-forward blind phase estimator, called the power law estimator (PLE) which works for both BPSK and QAM constellations which is given as:

$$\hat{\theta} = \frac{1}{M} \text{angle}\left( E\left[ (x_l^*)^M \sum_{\ell=0}^{N_D-1} r^M(l) \right] \right), \quad (4)$$

where M=2 for BPSK, M=4 for QAM, $x_l$ is the transmitted symbol, r(l) is a received symbol for a given NCP-SC block of N symbols ($N_D$ of which are data symbols and the remaining are null symbols).

Turning to an example BPSK blind phase noise correction, in this method an assumption is made that the phase error is small and hence can be tracked by performing a small rotation of the equalized constellation back to the proper alignment. Note that although the phase error can vary quite a bit across the slot (e.g., see FIG. 6), the variation is quite small from one NCP-SC block to the next. So if the equalization of the current block is performed with an aggregate phase error correction from all the previous blocks then the residual phase error should be small (e.g., within a few degrees).

Figure 8:
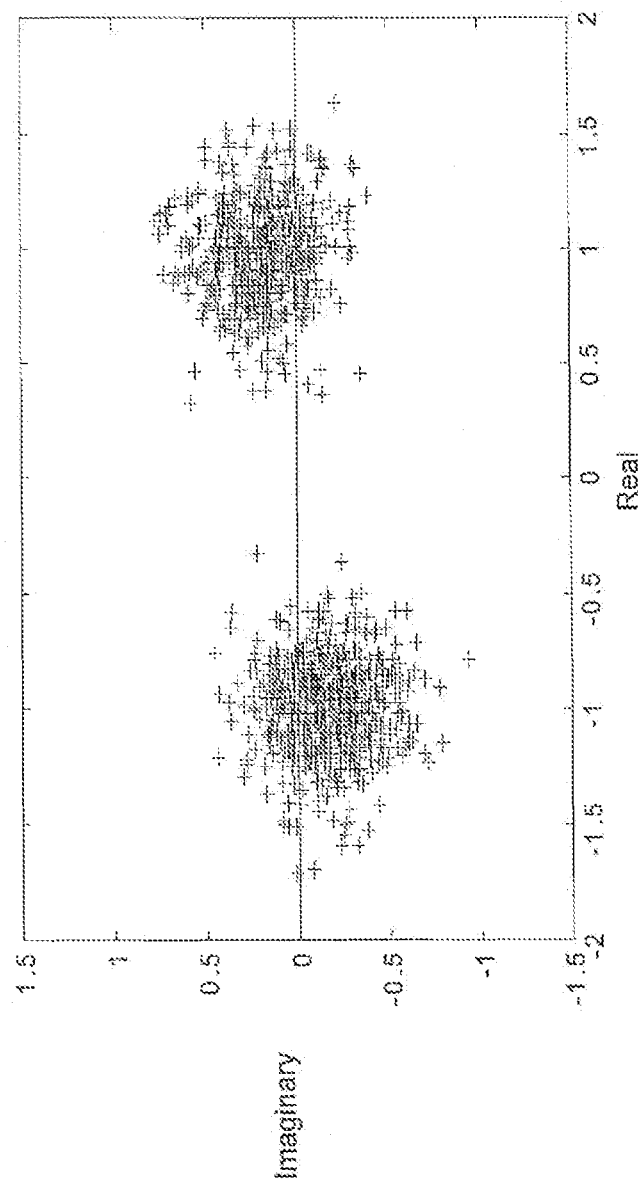
FIG. 8 is a graph of distorted BPSK signal for an SNR of 10 dB and a phase error of 10 degrees.

Take for example a BPSK signal consisting of +1 or −1 with a phase error of 10 degrees and an SNR of 10 dB whose distorted constellation is shown in FIG. 8. The observation that leads to the blind algorithm is that the phase error increases the variance of the received signal along the imaginary axis (e.g., relative to the variance that would occur without the phase error). Thus an example idea of the blind method is to find a phase rotation, θ, which when applied to the equalized signal minimizes the variance of the imaginary part of the signal constellation.

An example BPSK blind method is as follows. The first thing to note is that the BPSK symbols used may follow LTE's BPSK symbols, which are $\sqrt{0.5}(1+j)$ and $-\sqrt{0.5}(1+j)$ instead of +1 and −1. Thus to set up the equations for the blind method, the equalized BPSK symbols must first be mathematically rotated back to be along the x-axis (note that the final blind algorithm does not require this step, this step is only used in deriving the solution). Since scaling is not important, the equalized symbol, $r(n)=r_R(n)+jr_I(n)$, can be multiplied by (1−j) to get $r_R(n)+r_I(n)+j(r_I(n)-r_R(n))$ which will have the constellation aligned with the x (or real) axis. In vector form, the rotated equalized symbols over a NCP-SC block containing $N_D$ data symbols can be expressed as $r_R+r_I+j(r_I-r_R)$ where $r_D=r_R+jr_I=[r(0),\ldots,r(N_D-1)]^T$. Using this notation the blind method for BPSK is to find a phase metric θ on each NCP-SC block that solves:

$$\min_{\theta} |\text{Im}\{e^{j\theta}(r_R+r_I+j(r_I-r_R))\}|^2. \quad (5)$$

Using Euler's formula (i.e., that $\exp(j\theta)=\cos(\theta)+j\sin(\theta)$), the problem can be stated as:

$$\min_{\theta} |\sin\theta(r_R+r_I)+\cos\theta(r_I-r_R)|^2, \quad (6)$$

which reduces to $$\min_{\theta} |r_I-r_R|^2\cos^2\theta + 2(|r_I|^2-|r_R|^2)\cos\theta\sin\theta + |r_I+r_R|^2\sin^2\theta. \quad (7)$$

Taking the derivative with respect to θ and setting equal to zero gives $$2|r_I-r_R|^2 \cos\theta \sin\theta + 2(|r_I|^2-|r_R|^2)(\cos^2\theta-\sin^2\theta) + 2|r_I+r_R|^2 \cos\theta \sin\theta = 0 \quad (8)$$

Simplifying and using the identity that $-\sin^2 x = \cos^2 x - 1$ gives $$4r_I^T r_R \cos\theta \sin\theta - r_I^T r_I + r_R^T r_R + 2\cos^2\theta(r_I^T r_I - r_R^T r_R) = 0. \quad (9)$$

Let $t=\tan\theta$, and using the following identities, $$\sin\theta = \frac{\pm t}{\sqrt{1+t^2}} \text{ and } \cos\theta = \frac{\pm 1}{\sqrt{1+t^2}} \quad (10)$$

gives

-continued $$4r_I^T r_R \frac{t}{1+t^2} - r_I^T r_I + r_R^T r_R + \frac{2(r_I^T r_I - r_R^T r_R)}{1+t^2} = 0. \quad (11)$$

Simplifying further this equation becomes $$(r_R^T r_R - r_I^T r_I)t^2 \pm 4r_I^T r_R t - (r_R^T r_R - r_I^T r_I) = 0. \quad (12)$$

Letting $a=(r_R^T r_R - r_I^T r_I)$ and $b=4r_I^T r_R$, the equation becomes $$at^2+bt-a=0 \quad (13)$$

which is solvable using the quadratic equation to give $$t = \tan\theta = \frac{-b \pm \sqrt{b^2+4a^2}}{2a} \text{ or } \theta = \tan^{-1}\left(\frac{-b \pm \sqrt{b^2+4a^2}}{2a}\right). \quad (14)$$

Since θ should be small and the LTE BPSK constellation is centered in the first and third quadrants, b should be a positive value (i.e., both the real and imaginary parts of the equalized signal constellation are very likely to have the same signs). Hence the sign before the square root should be positive which would give the lowest value for θ. Using this fact and the fact that $\tan x \approx x$ for small x, the phase metric θ can be determined according to $$\theta = \frac{-b + \sqrt{b^2+4a^2}}{2a}. \quad (15)$$

If we let d=b/a, then this equation can be expressed as $$\theta = \frac{d}{2}\left(-1 + \sqrt{1+\frac{4}{d^2}}\right). \quad (16)$$

Since $d^2$ should be a fairly large quantity, the approximation that $\sqrt{1+x} \approx 1+0.5x$ for small x can be used to get $$\theta = \frac{d}{2}\left(-1+1+\frac{2}{d^2}\right) = \frac{1}{d} = \frac{a}{b}. \quad (17)$$

Hence, an estimate of the phase metric θ can be found simply as $$\theta = \frac{r_R^T r_R - r_I^T r_I}{4r_I^T r_R}. \quad (18)$$

However, the above metric may not perform well at low SNRs (e.g., SNRs of less than 0 dB). However by altering the metric, a new phase metric which may work better at low SNRs with no loss at higher SNRs can be found as:

$$\theta = \frac{r_R^T r_R - r_I^T r_I}{4\sum_{l=0}^{N_D-1} |\text{Re}\{r(l)\}||\text{Im}\{r(l)\}|} \quad (19)$$

where Re {r(l)} selects the real part of r(l), Im{r(l)} selects the imaginary part of r(l), and |●| is absolute value.

Note that rotated equalized symbols over a NCP-SC block containing $N_D$ data symbols are used above in an example to create the vectors $r_R$ and $r_I$. However, this is merely an example and other numbers (such as a mere plurality) of data symbols may be used.

Figure 9:
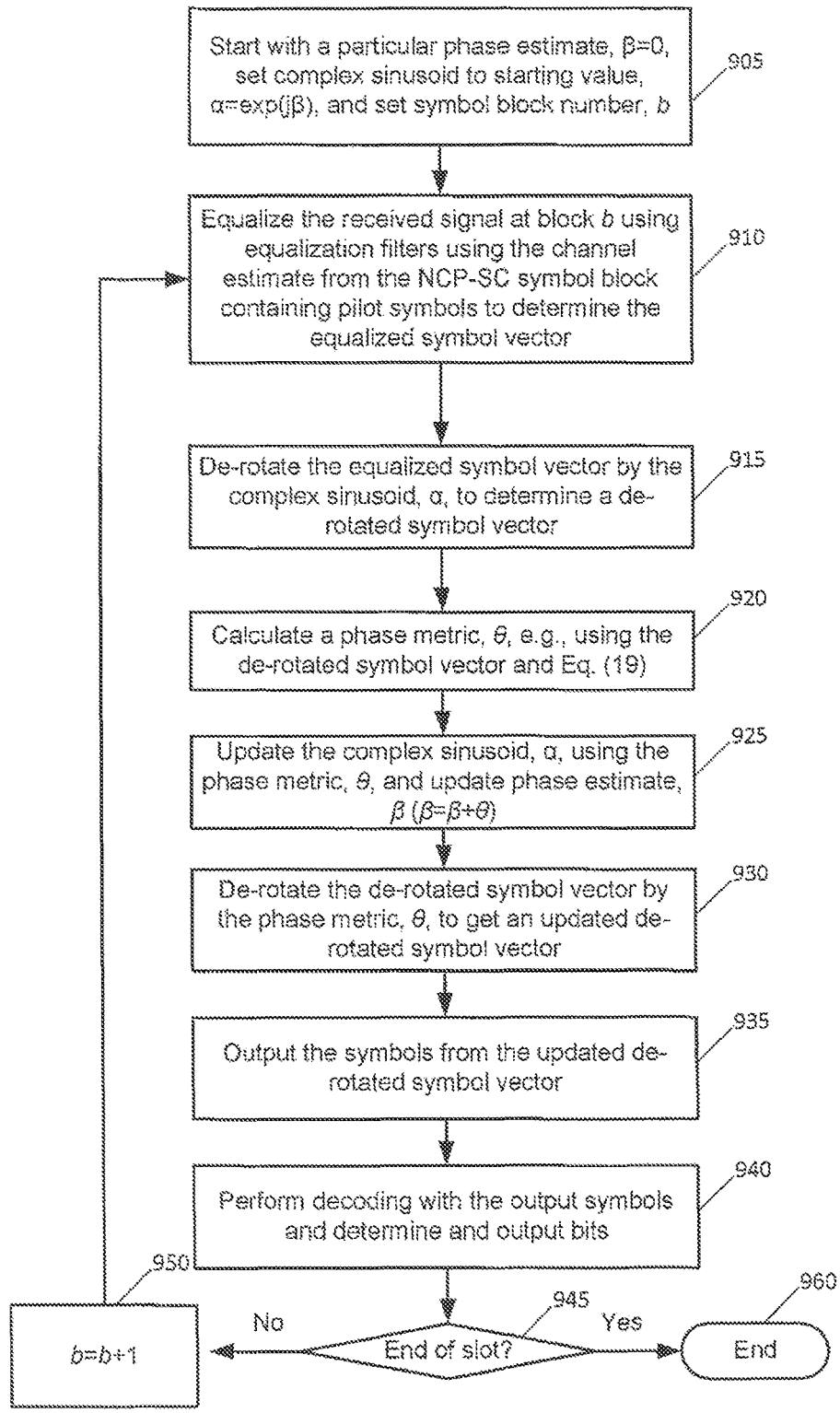
FIG. 9 is a block diagram of an example logic flow diagram for equalization and phase noise tracking and reduction for BPSK, and that illustrates the operation of an example method, a result of execution of computer program instructions embodied on a computer readable memory, and/or functions performed by logic implemented in hardware, in accordance with example embodiments herein.

Example operations for the blind estimator for the slot format of FIG. 4 are as follows and are illustrated in FIG. 9 (it is noted that blocks 905, 915-935, 945, 950, and 960 may be performed by the phase noise tracking and reduction circuitry 270):

1. Start with a phase estimate, $\beta=0$, and set complex sinusoid, $\alpha=\exp(j\beta)=1$, and symbol block number, b=13. See block 905. The phase estimate is assumed to be zero because the equalizer will be determined from the channel estimate found from the pilot block 410 (b=11) and hence the phase noise at block b=11 would be corrected through the channel estimate (and thus no further phase noise correction is needed on block 11). Note this symbol block number is merely example, as it matches with the example of FIG. 4, and any other symbol block number where the corresponding block starts a set of data blocks may be used. For instance, one can start with b=12 if meaningful data is sent there. The phase estimate, $\beta$, may be thought of as a phase estimate for a single block within a slot. For instance, as illustrated by FIG. 6, the phase noise varies quite a bit over the blocks in a slot, and the phase estimate, $\beta$, is used to estimate the phase noise at one of the blocks and $\beta$ will be tracked from block to block in order to remove the effects of the phase noise.

2. Equalize (e.g., by the equalizer 260) the received signal at block b using equalization filters using the channel estimate from the $11^{th}$ NCP-SC symbol block to determine the equalized symbol vector r'. See block 910.

3. De-rotate r' by a to get a de-rotated symbol vector, r (i.e., r=$\alpha$r'). That is, (block 915) de-rotate the equalized symbol vector by the complex sinusoid, $\alpha$, to determine a de-rotated symbol vector.

4. Calculate the phase metric $\theta$ from Eq. (19) using the de-rotated symbol vector. See block 920. The phase metric $\theta$ can be thought of as a phase estimate for the current block (b) which tracks how the phase noise changed from the previous block (b−1) to the current block. That is, while the phase estimate, $\beta$, is an estimate of the phase noise for the previous block, the phase metric $\theta$ is a phase estimate for the current block after removing the effects of the phase noise from the previous block (as is done in 915). In other words, the phase estimate, $\beta$, is an accumulation of the phase metric over multiple blocks previous to the current block.

5. Update the complex sinusoid $\alpha$: $\alpha=\alpha e^{j\theta}$, such that the phase estimate, $\beta$, is updated using the phase metric, $\theta$ in block 925 (i.e., $\beta=\beta+\theta$).

6. De-rotate r by $\theta$ to get $re^{j\theta}$ (block 930, where the de-rotated symbol vector is de-rotated by the updated phase estimate to get an updated de-rotated symbol vector) and use these de-rotated symbols for turbo decoding. That is, in block 935, the symbols from the updated de-rotated symbol vector are output, and in block 940, decoding is performed (e.g., by the decoder 280) with the output symbols and bits are determined and output.

7. If the end of the slot is reached (block 945=Yes), then stop (block 960), otherwise b=b+1 (block 950) and go to Step 2 (block 910).

Note that step 3 (915) could be performed in an alternate way in that the equalization filters themselves could be multiplied by a so that when equalization is performed, the de-rotation step is handled by the equalization. So conceptually the de-rotation step (915) is still being performed, it is just being performed as part of the equalization step (910). Note also that in step 4 (920) that any phase estimator could be used, for example equation (18), equations (20) or (21) below, or even a phase estimator known in the art like the aforementioned PLE.

Turning to an extension of the BPSK method to QAM symbols, the solution for BPSK can be also used for QAM signals by mapping any equalized symbols which are in the second (i.e., the real part is less than 0 and the imaginary part is greater than 0) or fourth (i.e., the real part is greater than 0 and the imaginary part is less than 0) quadrants to the first or third quadrants by multiplying these symbols by −j (which is equivalent to making the new real part be the imaginary part and the new imaginary part be the negative of the real part) or by +j (which is equivalent to making the new real part be the negative imaginary part and the new imaginary part be the real part). Note that an alternate way to check if the equalized symbol needs to be multiplied by −j or +j is if the sign of the real part does not equal the sign of the imaginary part.

An issue with the blind method is that there may be an error floor when using it with 64-QAM and higher modulations. The error floor at higher QAM modulations can be addressed by applying the algorithm now described.

Figure 10:
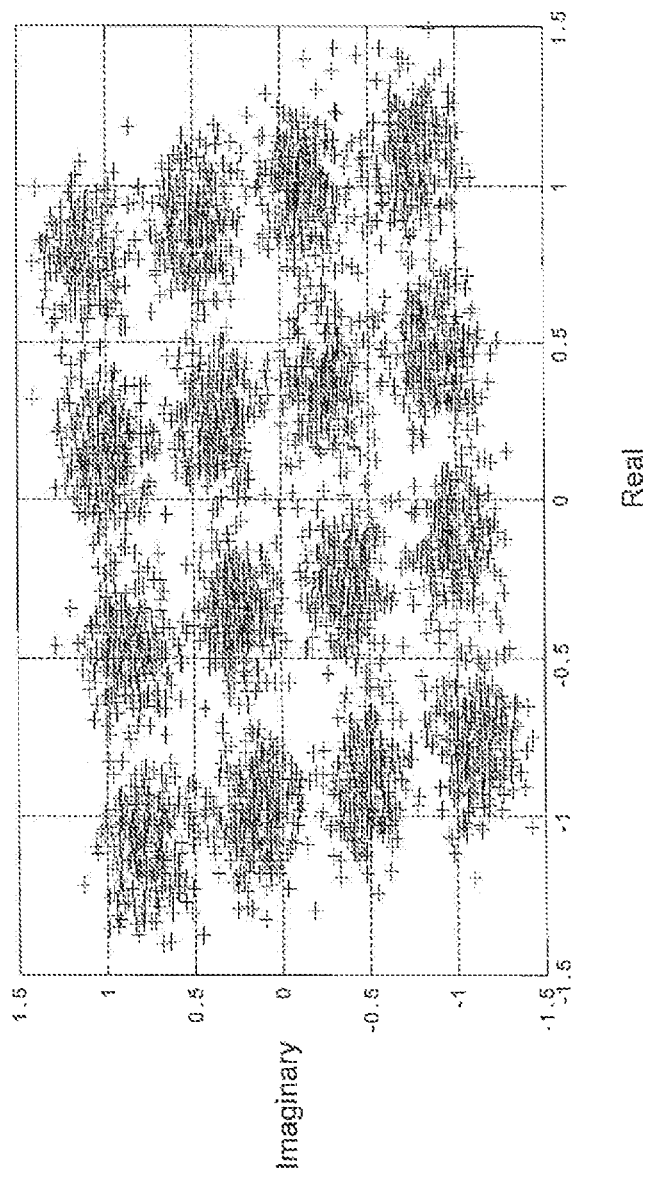
FIG. 10 is a graph of a distorted 16-QAM signal for an SNR of 15 dB and a phase error of 10 degrees.
Figure 11:
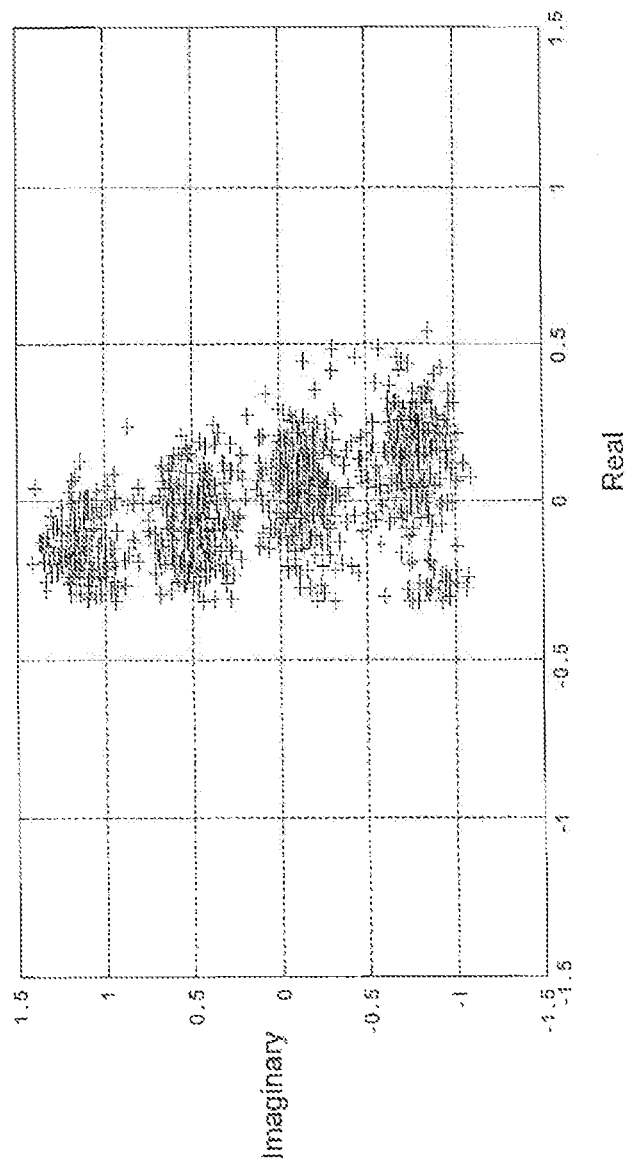
FIG. 11 is a graph of the points of the constellation in FIG. 10 greater than 2/sqrt(10) and also shifted by −3/sqrt(10)

Turning to a QAM-blind method, in this method the particular structure of the QAM constellations are used to create an improved blind method over the BPSK inspired method. An example idea is to use the outer constellation points to find the phase value to de-rotate the constellation. Take for example 16-QAM as shown in FIG. 10, which shows the effects of a 10 degree phase noise term with an after-equalization SNR of 15 dB. Taking the far-right constellation (i.e., where the real part is greater than 2/sqrt(10)) and shifting the constellation by −3/sqrt(10), one obtains the constellation shown in FIG. 11. An example idea then is to minimize the variance around the real part of this altered constellation. In fact to improve the performance, all outer points can be wrapped to this same area and be used to find the phase estimate (e.g., the constellation points whose imaginary parts are greater than 2/sqrt(10) can get multiplied by −j and then shifted by −3/sqrt(10), the constellation points whose imaginary parts are less than −2/sqrt(10) can get multiplied by j and then shifted by −3/sqrt(10), and the constellation points whose real parts are less than −2/sqrt (10) can get multiplied by −1 and then shifted by −3/sqrt (10)). Skipping the derivation and letting z be a vector containing all of the outer constellation points as described above, the phase metric can be found as:

$$\theta = \frac{z_I^T z_R}{z_I^T z_I - z_R^T z_R}. \tag{20}$$

It turns out, because some of the rotated outer constellation points are cut off by the slicing operation (see FIG. 11), that $\theta$ will be under-estimated. In other words only a partial correction will be made. Hence an iterative procedure may be used where several small corrections are needed using the formula in Eq. (20).

Figure 12A:
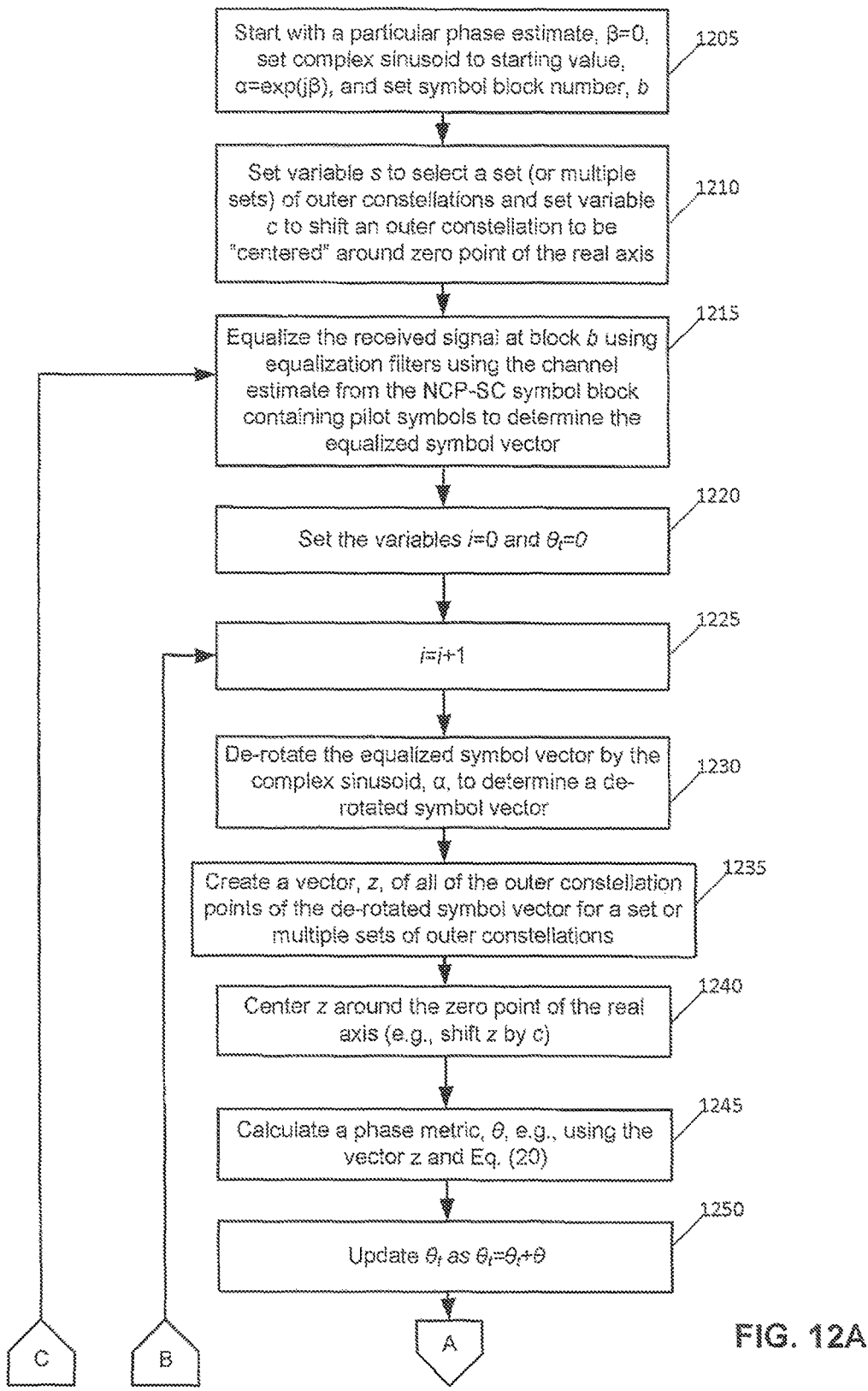
FIGS. 12A and 12B, is a block diagram of an example logic flow diagram for equalization and phase noise tracking and reduction for QPSK and QAM, and that illustrates the operation of an example method, a result of execution of computer program instructions embodied on a computer readable memory, and/or functions performed by logic implemented in hardware, in accordance with example embodiments herein.
Figure 12B:
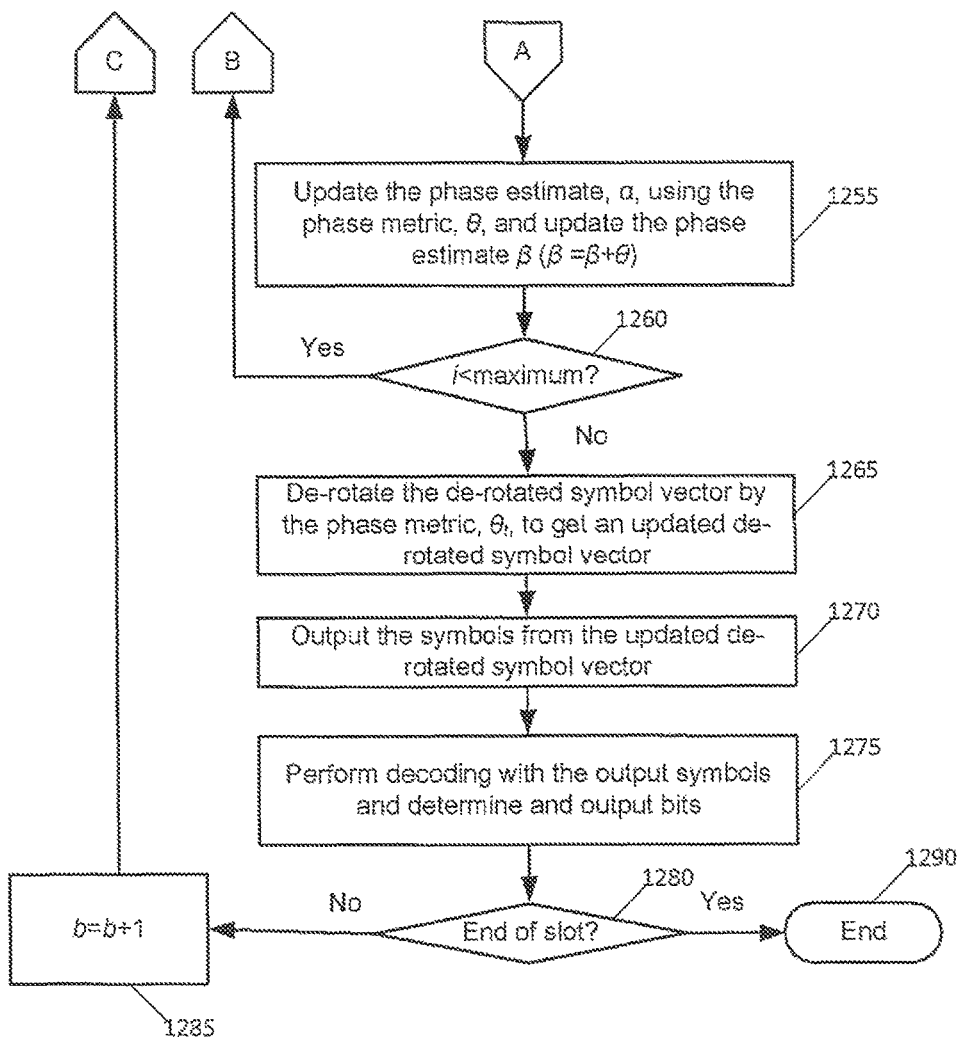

Example steps for the QAM-Blind method are (again using the assumption that block 13 is the first block containing coded data) as follows (see FIG. 12, including FIGS. 12A and 12B; note that blocks 1205, 1210, 1220-1270, 1280, 1285, and 1290 may be performed by the phase noise tracking and reduction circuitry 270):

1. Start with a phase estimate, β, of zero, complex sinusoid α=1 and symbol block number, b=13. See block 1205. The phase estimate is assumed to be zero because the equalizer will be determined from the channel estimate found from the pilot block (b=11) and hence the phase noise at block b=11 would be corrected through the channel estimate (and thus no further phase noise correction is needed on block 11). Note that one can start with b=12 if meaningful data is sent there, or at any other point where meaningful data is sent. For QPSK, set c=1/sqrt(2) and s=0, for 16-QAM set c=3/sqrt(10) and s=2/sqrt(10), for 64-QAM set c=7/sqrt(42) and s=6/sqrt(42), and for 256-QAM set c=15/sqrt(170) and s=14/sqrt(170). The value of the variable s is chosen to select a set (or multiple sets) of outer constellations based on the modulation scheme being used and the value of the variable c is chosen to shift an outer constellation to be "centered" around the zero point of the real axis (or centered around the imaginary axis). See block 1210.

2. Equalize (e.g., by the equalizer 260) the received signal at block b using equalization filters using the channel estimate from the $11^{th}$ NCP-SC symbol block (or whatever block has pilot symbols) to get the equalized symbol vector r'. See block 1215. Set iteration number i=0 and $\theta_t$=0 (in this step $\theta_t$ is the initial phase metric) in block 1220.

3. Set the variable i=i+1 in block 1225. De-rotate r' by α to get a de-rotated symbol vector, r (i.e., r=αr'). Denote $r_n$ as the $n^{th}$ element of r. That is, de-rotate the equalized symbol vector by the complex sinusoid, a, to determine a de-rotated symbol vector in block 1230.

4. Create a vector, z, of all of the outer constellation points of the de-rotated symbol vector by concatenating the following four sets of constellation points: 1) all $r_n$ where Re($r_n$)>s, 2) all $r_n$ where Im($r_n$)>s (these $r_n$ are multiplied by −j), 3) all $r_n$ where Re($r_n$)<−s (these $r_n$ are multiplied by −1), and 4) all $r_n$ where Im($r_n$)<−s (these $r_n$ are multiplied by +j). See block 1235. Note that it is also possible to use a single set of constellation points or less than four sets.

5. Shift z by c (i.e., z=z−c). That is, z is centered around the zero point of the real axis (or centered around the imaginary axis) in block 1240.

6. Calculate the phase metric θ using the vector z and Eq. (20) (block 1245) and update the initial phase metric, $\theta_t$ as $\theta_t=\theta_t+\theta$ (block 1250).

7. Update α: $\alpha=\alpha e^{j\theta}$. That is, in block 1255, the complex sinusoid, α, is updated using the phase metric, θ. Furthermore, the phase estimate, β, is updated using the phase metric, θ in block 1255 (i.e., β=β+θ). If the iteration number, i, is less than a maximum number of iterations (e.g., 4) (block 1260=Yes) then go to Step 3 (block 1225), otherwise go to Step 8 (block 1265).

8. De-rotate r' by $\theta_t$ to determine r' $e^{j\theta_t}$ (block 1265), and output the symbols from the updated de-rotated symbol vector (block 1270). These de-rotated and output symbols are used for decoding (block 1275) such as turbo decoding. The decoding in block 1275 may be performed by the decoder 280.

9. If the end of the slot is reached (block 1280=Yes), then stop (block 1290), otherwise b=b+1 (block 1285) and the flow proceeds to Step 2 (block 1215).

Example benefits and technical effects of the some exemplifying embodiments herein comprise one or more of the following:
1. Improved performance at very low SNRs.
2. Improved performance at higher SNRs for higher order QAM.
3. Ability to work with any QAM modulation.
4. Fairly low computational complexity.
5. Future mmWave systems will likely need to have this sort of phase noise tracking unless an excessive amount of pilot symbols are used on each data block.
6. No need for additional training symbols. In other words a single block of pilots can be used for channel estimation and then the phase noise tracking can be performed in a blind sense. Thus the block of pilots can be spaced vary sparsely in time.
7. Enables retaining the null prefixes (i.e., to not replace the null prefix with training symbols) which allows one to keep the desired null prefixes. The null prefixes provide the ability to switch RF beams without adding additional guard times, keeping the low out of band emissions of null prefixes, and retaining a simple numerology with the ability to adaptively change cyclic prefix sizes per user.

Note that the formulation in equations (18) and (19) assumed a BPSK signal which followed LTE which consisted of constellation points which are either (1+j)/sqrt(2) or −(1+j)/sqrt(2). However, other BPSK signals could also be used, like +1 and −1 instead of (1+j)/sqrt(2) and −(1+j)/sqrt(2). One way to use these non-LTE BPSK constellations with the phase estimation formulas of (18) and (19) is to rotate the received signal by the appropriate amount so that the received signal now looks like the received LTE BPSK constellations. For example, if +1 and −1 BPSK symbols are used, then the received symbols could be first rotated by 45 degrees to create LTE-like BPSK constellations and then equations (18) and (19) could be directly used. Another option is to reformulate (18) and (19) to match the transmitted BPSK constellation. For example if +1 and −1 BPSK symbols are used, then $r_R$ and $r_I$ in (18) and (19) could be rotated by −45 degrees to get a phase metric estimate θ for BPSK symbols consisting of +1 and −1 given as $$\theta = \frac{r_I^T r_R}{r_I^T r_I - r_R^T r_R}. \tag{21}$$

As before, this metric may not perform well at low SNRs (e.g., SNRs of less than 0 dB). However by altering the metric, a new phase metric which may work better at low SNRs with no loss at higher SNRs can be found as:

$$\theta = \frac{\sum_{l=0}^{N_D-1} |\text{Re}\{r(l)\}||\text{Im}\{r(l)\}|}{r_I^T r_I - r_R^T r_R} \tag{22}$$

where Re {r(l)} selects the real part of r(l), Im{r(l)} selects the imaginary part of r(l), and |●| is absolute value.

An apparatus herein can be a user equipment 110, an eNB 190, a wireless modem, a receiver, or any other element that receives data and uses one or more of the techniques presented above.

The following are examples of possible implementations.

Example 1

A method, comprising: equalizing by an apparatus, based on a pilot block, a group of data symbols for a current block of data symbols in a plurality of blocks received over a communication channel to generate a group of equalized symbols; and de-rotating by the apparatus the group of equalized symbols as a function of a phase estimate to determine initial de-rotated equalized symbols, wherein the phase estimate is an estimate of phase caused by noise for blocks previous to the current block of data symbols.

Example 2

The method of example 1, further comprising: calculating by the apparatus a phase metric from real and imaginary parts of the initial de-rotated equalized symbols in the group, wherein the phase metric estimates phase caused by noise for the current block; updating by the apparatus the current phase estimate with the phase metric; de-rotating by the apparatus the initial de-rotated equalized symbols by the phase metric to determine final equalized and de-rotated symbol estimates; and outputting by the apparatus the final equalized and de-rotated symbol estimates.

Example 3

The method of example 2, wherein the phase metric is further calculated from an absolute value of real and imaginary parts of the initial de-rotated equalized symbols.

Example 4

The method of example 3, wherein the phase metric is calculated $$\theta = \frac{r_R^T r_R - r_I^T r_I}{4 \sum_{l=0}^{N_D-1} |\text{Re}\{r(l)\}||\text{Im}\{r(l)\}|},$$

as where $r_R$ is a vector containing a real part of a plurality of initial de-rotated equalized symbols, $r_I$ is a vector containing an imaginary part of the plurality of initial de-rotated equalized symbols, and $r(l)$ is the $l^{th}$ initial de-rotated equalized symbol.

Example 5

The method of example 4, wherein the plurality of initial de-rotated equalized symbols is $N_D$ initial de-rotated equalized symbols and wherein a block contains $N_D$ data symbols.

Example 6

The method of example 4, wherein certain initial de-rotated equalized symbols that are in a second quadrant or a fourth quadrant are multiplied, before calculating the phase metric, by $-j$ or $+j$ to map the certain initial de-rotated equalized symbols into the first quadrant or third quadrant.

Example 7

The method of example 2, wherein the data symbols form a constellation comprising a plurality of constellation points and comprising inner and outer constellation points, wherein the phase metric is calculated as the following:

$$\theta = \frac{z_I^T z_R}{z_I^T z_I - z_R^T z_R},$$

wherein $z_R$ is a vector containing a real part of constellation points in one or more sets of only outer constellation points of $N_D$ initial de-rotated equalized symbols, $z_I$ is a vector containing an imaginary part of the constellation points of the one or more sets of only the outer constellation points in the group of $N_D$ initial de-rotated equalized symbols.

Example 8

The method of example 7, wherein a set of only the outer constellation points is formed by choosing all $r_n$ where $\text{Re}(r_n)>s$, where $r_n$ is a constellation point, $\text{Re}(r_n)$ selects a real part of $r_n$ and s is chosen to select the set of outer constellations based on the modulation scheme being used.

Example 9

The method of example 8, wherein: for quadrature phase shift keying, s=0; for 16-quadrature amplitude modulation (16-QAM), s=2/sqrt(10) wherein sqrt( ) is square root; for 64-QAM, s=6/sqrt(42); and for 256-QAM, s=14/sqrt(170).

Example 10

The method of example 7, wherein: a first set of only the outer constellation points is formed by choosing all $r_n$ where $\text{Re}(r_n)>s$; a second set of only the outer constellation points is formed by choosing all $r_n$ where $\text{Im}(r_n)>s$ and the method further comprises multiplying the $r_n$ in the second set $-j$; a third set of only the outer constellation points is formed by choosing all $r_n$ where $\text{Re}(r_n)<-s$ and the method further comprises multiplying the $r_n$ in the third set by $-1$; a fourth set of only the outer constellation points is formed by choosing all $r_n$ where $\text{Im}(r_n)<-s$ and the method further comprises multiplying the $r_n$ in the fourth set by $+j$, $r_n$ is a constellation point, $\text{Re}(r_n)$ selects a real part of $r_n$, $\text{Im}(r_n)$ selects an imaginary part of $r_n$, and s is chosen to select outer constellations based on the modulation scheme being used.

Example 11

The method of example 10, wherein: for quadrature phase shift keying, s=0; for 16-quadrature amplitude modulation (16-QAM), s=2/sqrt(10) wherein sqrt( ) is square root; for 64-QAM, s=6/sqrt(42); and for 256-QAM, s=14/sqrt(170).

Example 12

The method of example 7, wherein z is a vector containing all of the outer constellation points, and wherein the method further comprises, prior to calculating the phase metric, shifting z by c, where c is set to shift an outer constellation to be centered around the imaginary axis.

Example 13

The method of example 12, wherein: for quadrature phase shift keying, c=1/sqrt(2), wherein sqrt( ) is square root; for 16-quadrature amplitude modulation (16-QAM), c=3/sqrt(10); for 64-QAM, c=7/sqrt(42); and for 256-QAM, c=15/sqrt(170).

Example 14

The method of any of examples 2 to 13, wherein de-rotating by an apparatus a group of equalized symbols as a function of a current phase estimate, calculating a phase metric, and updating the current phase estimate are performed for a predetermined number of times prior to de-rotating by the apparatus the initial de-rotated equalized symbols by the phase metric to determine final equalized and de-rotated symbol estimates.

Example 15

The method of any of examples 2 to 14, wherein de-rotating a group of equalized symbols, calculating, updating, de-rotating the initial de-rotated equalized symbols, and outputting are performed for the plurality of blocks.

Example 16

The method of any of examples 2 to 15, further comprising: decoding the final equalized and de-rotated symbol estimates to create output bits.

Example 17

An apparatus, comprising: an equalizer configured to equalize, based on a pilot block, a group of data symbols for a current block of data symbols in a plurality of blocks received over a communication channel to generate a group of equalized symbols; and phase noise tracking and reduction circuitry configured to de-rotate the group of equalized symbols as a function of a phase estimate to determine initial de-rotated equalized symbols, wherein the phase estimate is an estimate of phase caused by noise for blocks previous to the current block of data symbols.

Example 18

The apparatus of example 17, wherein the phase noise tracking and reduction circuitry is further configured to calculate a phase metric from real and imaginary parts of the initial de-rotated equalized symbols in the group, wherein the phase metric estimates phase caused by noise for the current block, the circuitry further configured to update the current phase estimate with the phase metric, to de-rotate the initial de-rotated equalized symbols by the phase metric to determine final equalized and de-rotated symbol estimates, and to output the final equalized and de-rotated symbol estimates.

Example 19

The apparatus of example 18, wherein phase noise tracking and reduction circuitry is configured to calculate the phase metric from an absolute value of real and imaginary parts of the initial de-rotated equalized symbols.

Example 20

The apparatus of example 19, wherein phase noise tracking and reduction circuitry is configured to calculate the phase metric as $$\theta = \frac{r_R^T r_R - r_I^T r_I}{4 \sum_{l=0}^{N_D-1} |\text{Re}\{r(l)\}||\text{Im}\{r(l)\}|},$$

where $r_R$ is a vector containing a real part of a plurality of initial de-rotated equalized symbols, $r_I$ is a vector containing an imaginary part of the plurality of initial de-rotated equalized symbols, and $r(l)$ is the $l^{th}$ initial de-rotated equalized symbol.

Example 21

The apparatus of example 20, wherein the plurality of initial de-rotated equalized symbols is $N_D$ initial de-rotated equalized symbols and wherein a block contains $N_D$ data symbols.

Example 22

The apparatus of example 20, wherein the phase noise tracking and reduction circuitry is configured to multiply, before calculating the phase metric, certain initial de-rotated equalized symbols that are in a second quadrant or a fourth quadrant by $-j$ or $+j$ to map the certain initial de-rotated equalized symbols into the first quadrant or third quadrant.

Example 23

The apparatus of example 17, wherein the data symbols form a constellation comprising a plurality of constellation points and comprising inner and outer constellation points, wherein the phase noise tracking and reduction circuitry is configured to calculate the phase metric as the following:

$$\theta = \frac{z_I^T z_R}{z_I^T z_I - z_R^T z_R},$$

wherein $z_R$ is a vector containing a real part of constellation points in one or more sets of only outer constellation points of $N_D$ initial de-rotated equalized symbols, $z_I$ is a vector containing an imaginary part of the constellation points of the one or more sets of only the outer constellation points in the group of $N_D$ initial de-rotated equalized symbols.

Example 24

The apparatus of example 23, wherein the phase noise tracking and reduction circuitry is configured to form a set of only the outer constellation points by choosing all $r_n$ where $\text{Re}(r_n) > s$, where $r_n$ is a constellation point, $\text{Re}(r_n)$ selects a real part of $r_n$ and s is chosen to select the set of outer constellations based on the modulation scheme being used.

Example 25

The apparatus of example 24, wherein: for quadrature phase shift keying, $s=0$; for 16-quadrature amplitude modulation (16-QAM), $s=2/\text{sqrt}(10)$ wherein sqrt( ) is square root; for 64-QAM, $s=6/\text{sqrt}(42)$; and for 256-QAM, $s=14/\text{sqrt}(170)$.

Example 26

The apparatus of example 23, wherein: the phase noise tracking and reduction circuitry is configured: to form a first set of only the outer constellation points by choosing all $r_n$ where $\text{Re}(r_n) > s$; to form a second set of only the outer constellation points by choosing all $r_n$ where $\text{Im}(r_n) > s$ and to multiply the $r_n$ in the second set $-j$; to form a third set of only the outer constellation points by choosing all $r_n$ where $Re(r_n)<-s$ and to multiply the $r_n$ in the third set by −1; to form a fourth set of only the outer constellation points by choosing all $r_n$ where $Im(r_n)<-s$ and to multiply the $r_n$ in the fourth set by +j, $r_n$, is a constellation point, $Re(r_n)$ selects a real part of $r_n$, $Im(r_n)$ selects an imaginary part of $r_n$, and s is chosen to select outer constellations based on the modulation scheme being used.

Example 27

The apparatus of example 26, wherein: for quadrature phase shift keying, s=0; for 16-quadrature amplitude modulation (16-QAM), s=2/sqrt(10) wherein sqrt( ) is square root; for 64-QAM, s=6/sqrt(42); and for 256-QAM, s=14/sqrt(170).

Example 28

The apparatus of example 23, wherein z is a vector containing all of the outer constellation points, and wherein the phase noise tracking and reduction circuitry is configured, prior to calculating the phase metric, shifting z by c, where c is set to shift an outer constellation to be centered around the imaginary axis.

Example 29

The apparatus of example 28, wherein: for quadrature phase shift keying, c=1/sqrt(2) wherein sqrt( ) is square root; for 16-quadrature amplitude modulation (16-QAM), c=3/sqrt(10); for 64-QAM, c=7/sqrt(42); and for 256-QAM, c=15/sqrt(170).

Example 30

The apparatus of any of examples 18 to 29, wherein the phase noise tracking and reduction circuitry is configured to perform de-rotating a group of equalized symbols as a function of a current phase estimate, calculating a phase metric, and updating the current phase estimate for a predetermined number of times prior to de-rotating the initial de-rotated equalized symbols by the phase metric to determine final equalized and de-rotated symbol estimates.

Example 31

The apparatus of any of examples 18 to 30, wherein the phase noise tracking and reduction circuitry is configured to perform de-rotating a group of equalized symbols, calculating, updating, de-rotating the initial de-rotated equalized symbols, and outputting for the plurality of blocks.

Example 32

The apparatus of any of examples 18 to 31, further comprising: a decoder configured to decode the final equalized and de-rotated symbol estimates to create output bits.

Example 33

The apparatus of any of examples 17 to 32, wherein the phase noise tracking and reduction circuitry is implemented as hardware, a processor configured to execute software, or a combination of hardware and the processor configured to execute software.

Example 34

A computer program product comprising a computer-readable storage medium bearing computer program code embodied therein for use with a computer, the computer program code comprising: code for equalizing by an apparatus, based on a pilot block, a group of data symbols for a current block of data symbols in a plurality of blocks received over a communication channel to generate a group of equalized symbols; and code for de-rotating by the apparatus the group of equalized symbols as a function of a phase estimate to determine initial de-rotated equalized symbols, wherein the phase estimate is an estimate of phase caused by noise for blocks previous to the current block of data symbols.

Example 34

An apparatus comprising means for performing the method in any of examples 1 to 16.

Example 35

A base station comprising the apparatus of any of examples 17 to 33.

Example 36

A user equipment comprising the apparatus of any of examples 17 to 33.

Example 37

A modem comprising the apparatus of any of examples 17 to 33.

Example 38

A system comprising the apparatus of any of examples 17 to 33.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory(ies) 125, 155 or other device) that may be any media or means that can contain or store the instructions for use by or in connection with an instruction execution system, apparatus, or device, such as a computer. A computer readable storage medium does not, however, encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third generation partnership project
4G Fourth generation
5G Fifth generation
BPSK Binary Phase Shift Keying
dB decibels
DSP Digital Signal Processor
Eq. Equation
GHz gigahertz
IEEE Institute of Electrical and Electronics Engineers
eNB evolved NodeB (e.g., LTE base station)
LO local oscillator
LTE Long term evolution
mm millimeter
MME Mobility Management Entity
mmWave Millimeter wave
NCP-SC Null Cyclic Prefix-Single Carrier
nsec nanoseconds
OFDM Orthogonal Frequency Division Multiplexing
PSD Power Spectral Density
QAM Quadrature Amplitude Modulation
QPSK Quadrature Phase Shift Keying
Rel Release
RF Radio Frequency
Rx Reception or Receiver
SGW Serving gateway
SNR Signal to Noise Ratio
sqrt square root
Tx Transmission or Transmitter
UE User equipment (e.g., a wireless, mobile device)

What is claimed is:

1. A method, comprising:
setting by an apparatus a complex sinusoid to an initial value for a current block of data symbols of a plurality of blocks, wherein the complex sinusoid is set to the initial value based on a phase estimate that is an estimate of phase caused by noise for blocks previous to the current block of data symbols;
equalizing by the apparatus a plurality of data symbols for the current block of data symbols to generate a plurality of received and equalized symbols;
de-rotating by the apparatus the plurality of received and equalized symbols using the complex sinusoid to determine a plurality of initial de-rotated received and equalized symbols; and
calculating by the apparatus a phase metric from real and imaginary parts of the plurality of initial de-rotated received and equalized symbols, wherein the phase metric estimates phase caused by noise for the current block;
de-rotating by the apparatus the plurality of initial de-rotated received and equalized symbols by the phase metric to determine a plurality of final received and equalized and de-rotated symbol estimates;
outputting by the apparatus the plurality of final received and equalized and de-rotated symbol estimates;
updating by the apparatus the phase estimate with the phase metric for use for a next block of data symbols; and
updating by the apparatus the complex sinusoid using the phase estimate for use for the next block of data symbols.

2. The method of claim 1, wherein the phase metric is calculated as $$\theta = \frac{r_R^T r_R - r_I^T r_I}{4 \sum_{l=0}^{N_D-1} |\text{Re}\{r(l)\}||\text{Im}\{r(l)\}|},$$

where $r_R$ is a vector containing the real part of the plurality of $N_D$ initial de-rotated received and equalized symbols, $r_I$ is a vector containing the imaginary part of the plurality of initial de-rotated received and equalized symbols, and $r(l)$ is the $l^{th}$ one of the initial de-rotated received and equalized symbols.

3. The method of claim 2, wherein any of the plurality of initial de-rotated received and equalized symbols that are in a second quadrant or a fourth quadrant are multiplied, before calculating the phase metric, by either −j or +j depending on a sign of the real and the imaginary parts, to map the respective initial de-rotated received and equalized symbol into the first quadrant or third quadrant.

4. The method of claim 1, wherein de-rotating the plurality of received and equalized symbols as a function of a current phase estimate, calculating the phase metric, and updating the current phase estimate are performed for a predetermined number of times prior to de-rotating the plurality of initial de-rotated received and equalized symbols by the phase metric to determine the plurality of final received and equalized and de-rotated symbol estimates.

5. The method of claim 1, further comprising decoding the plurality of final received and equalized and de-rotated symbol estimates to create output bits.

6. The method of claim 1, wherein the plurality of data symbols in the current block comprise quadrature phase shift keying data symbols.

7. The method of claim 1, further comprising performing the following until all of the plurality of blocks have been processed, wherein each current block uses the phase estimate and the complex sinusoid updated in the previous block: the setting, equalizing, de-rotating by the apparatus the plurality of received and equalized symbols using the complex sinusoid, calculating, de-rotating by the apparatus the plurality of initial de-rotated received and equalized symbols by the phase metric, updating the phase estimate, and updating the complex sinusoid using the phase estimate.

8. An apparatus, comprising:
phase noise tracking and reduction circuitry configures to set a complex sinusoid to an initial value for a current block of data symbols of a plurality of blocks, wherein the complex sinusoid is set to the initial value based on a phase estimate that is an estimate of phase caused by noise for blocks previous to the current block of data symbols;
an equalizer configured to equalize a plurality of data symbols for the current block of data symbols to generate a plurality of received and equalized symbols; and
the phase noise tracking and reduction circuitry configured to de-rotate the plurality of received and equalized symbols using the complex sinusoid to determine a plurality of initial de-rotated received and equalized symbols, configured to de-rotate the plurality of initial de-rotated received and equalized symbols by the phase metric to determine a plurality of final received and equalized and de-rotated symbol estimates, configured to output the plurality of final received and equalized and de-rotated symbol estimates, configured to update the phase estimate with the phase metric for use for a next block of data symbols, and configured to update the complex sinusoid using the phase estimate for use for the next block of data symbols.

9. The apparatus of claim 8, wherein the phase noise tracking and reduction circuitry is implemented as hardware, a processor configured to execute software, or a combination of hardware and the processor configured to execute software.

10. An apparatus, comprising:
one or more processors; and
one or more memories including computer program code,
the one or more memories and the computer program code configured, with the one or more processors, to cause the apparatus to perform at least the following:
set a complex sinusoid to an initial value for a current block of data symbols of a plurality of blocks, wherein the complex sinusoid is set to the initial value based on a phase estimate that is an estimate of phase caused by noise for blocks previous to the current block of data symbols;
equalize the plurality of data symbols for the current block of data symbols to generate a plurality of received and equalized symbols;
de-rotate the plurality of received and equalized symbols using the complex sinusoid to determine a plurality of initial de-rotated received and equalized symbols;
calculate a phase metric from real and imaginary parts of the a plurality of initial de-rotated received and equalized symbols, wherein the phase metric estimates phase caused by noise for the current block;
de-rotating the plurality of initial de-rotated received and equalized symbols by the phase metric to determine a plurality of final received and equalized and de-rotated symbol estimates;
outputting the plurality of final received and equalized and de-rotated symbol estimates;
updating the phase estimate with the phase metric for use for a next block of data symbols; and
updating the complex sinusoid using the phase estimate for use for the next block of data symbols.

11. The apparatus of claim 10, wherein the phase metric is calculated as $$\theta = \frac{r_R^T r_R - r_I^T r_I}{4 \sum_{l=0}^{N_D-1} |\text{Re}\{r(l)\}||\text{Im}\{r(l)\}|},$$

where $r_R$ is a vector containing the real part of the plurality of initial de-rotated received and equalized symbols, $r_I$ is a vector containing the imaginary part of the plurality of initial de-rotated received and equalized symbols, and $r(l)$ is the $l^{th}$ a one of the $N_D$ initial de-rotated received and equalized symbol.

12. The apparatus of claim 11, wherein any of the a plurality of initial de-rotated received and equalized symbols that are in a second quadrant or a fourth quadrant are multiplied, before calculating the phase metric, by either $-j$ or $+j$ depending on a corresponding sign of the real and the imaginary parts, to map the respective initial de-rotated received and equalized symbol into the first quadrant or third quadrant.

13. The apparatus of claim 10, wherein de-rotating the plurality of received and equalized symbols as a function of a current phase estimate, calculating the phase metric, and updating the current phase estimate are performed for a predetermined number of times prior to de-rotating the plurality of initial de-rotated received and equalized symbols by the phase metric to determine the plurality of final received and equalized and de-rotated symbol estimates.

14. The apparatus of claim 10, wherein the one or more memories and the computer program code are configured with the one or more processors to cause the apparatus further to decode the plurality of final received and equalized and de-rotated symbol estimates to create output bits.

15. The apparatus of claim 10, wherein the one or more memories and the computer program code are configured, with the one or more processors, to cause the apparatus to perform at least the following: performing the following until all of the plurality of blocks have been processed, wherein each current block uses the phase estimate and the complex sinusoid updated in the previous block: the setting, equalizing, de-rotating by the apparatus the plurality of received and equalized symbols using the complex sinusoid, calculating, de-rotating by the apparatus the plurality of initial de-rotated received and equalized symbols by the phase metric, updating the phase estimate, and updating the complex sinusoid using the phase estimate.

* * * * *

UNITED STATES PATENT AND TRADEMARK OFFICE
CERTIFICATE OF CORRECTION

| | |
|---|---|
| PATENT NO. | : 10,129,056 B2 |
| APPLICATION NO. | : 15/283654 |
| DATED | : November 13, 2018 |
| INVENTOR(S) | : Timothy Thomas et al. |

Page 1 of 1

It is certified that error appears in the above-identified patent and that said Letters Patent is hereby corrected as shown below:

In Claim 1:
Column 21, Line 53, "and" should be deleted.

Signed and Sealed this
Twenty-fifth Day of December, 2018

Andrei Iancu
*Director of the United States Patent and Trademark Office*